United States Patent [19]
Larson

[11] Patent Number: 5,603,343
[45] Date of Patent: Feb. 18, 1997

[54] PASSAGEWAY FOR LOADING AND UNLOADING AIRCRAFT

[75] Inventor: James Larson, 28 Forrest Dr., Lloyd Harbor, N.Y. 11743

[73] Assignee: James Larson, Lloyd Harbor, N.Y.

[21] Appl. No.: 383,060

[22] Filed: Feb. 3, 1995

[51] Int. Cl.⁶ .............................. F04H 15/32; F01D 1/00
[52] U.S. Cl. .......................... 135/131; 135/122; 135/151; 135/152; 52/69; 14/71.5
[58] Field of Search ........................... 52/64–67, 69, 52/173.2; 135/122, 130, 131, 151, 152, 144, 145, 124; 14/71.5

[56] References Cited

U.S. PATENT DOCUMENTS

| | | | |
|---|---|---|---|
| 2,470,337 | 5/1949 | Campbell | 135/131 X |
| 2,700,169 | 1/1955 | Henion | 14/71.5 |
| 2,828,757 | 4/1958 | Thaxton, Jr. | 135/152 X |
| 2,967,534 | 1/1961 | Silye | 135/143 |
| 3,042,053 | 7/1962 | Gabriel | 135/130 |
| 3,046,850 | 7/1962 | Tellefson et al. | 14/71.5 X |
| 3,131,705 | 5/1964 | Marino | 135/131 |
| 3,703,737 | 11/1972 | Eggert, Jr. | 14/71.5 |
| 3,808,626 | 5/1974 | Magill | 14/71.5 |
| 4,559,660 | 12/1985 | Lichti | 14/71.5 X |
| 5,005,896 | 4/1991 | Li | 135/131 X |
| 5,331,777 | 7/1994 | Chi-Yuan | 135/124 X |

FOREIGN PATENT DOCUMENTS 0749847  6/1956  United Kingdom .................. 135/122

*Primary Examiner*—Carl D. Friedman
*Assistant Examiner*—Winnie Yip
*Attorney, Agent, or Firm*—Bauer & Schaffer

[57] ABSTRACT

A plurality of independent U-shaped frame sections are articulately connected in an end series to form a flexible corridor. Each frame section is U-shaped being open at the bottom and supported on a wheel assembly and covered by a weatherproof fabric roof. Each is formed with collapsible side walls allowing collapsing in the longitudinal direction.

13 Claims, 3 Drawing Sheets

PASSAGEWAY FOR LOADING AND UNLOADING AIRCRAFT

BACKGROUND OF THE INVENTION

The present invention relates to apparatus permitting the swift and safe loading of small aircraft and in particular to a walkway for the protective movement of passengers to and from commuter aircraft.

Examples of gangways for large aircraft are shown in U.S. Pat. Nos. 3,683,440; 4,559,660 and 4,984,321. The conventional gangway is essentially a movable articulating steel enclosed corridor or bridge which when docked to an airplane provides a safe pathway for passenger traffic to and from the terminal. These jet bridges, as they are known, were designed and intended for use only with large jet engine type aircraft (i.e. Boeing 727, 737, 757, 767, 747) with door sill height ranging between 6' to 16' above ground. Such jet bridges cannot be used for commuter type aircraft which are only a fraction of the height of the jet airplanes and have a door sill well below 6 feet. Further, the smaller commuter aircraft are loaded at ground level and are provided with their own stairway. At present there is no bridge or pathway apparatus which can dock with a commuter aircraft on ground level having the capability of extending and retracting while simultaneously swinging left and right, so as to meet the aircraft where parked.

Presently, some users have constructed short permanent type awning walkways which protect passengers only part of the way to the aircraft. Due to the nature of commuter aircraft operation, no permanent fixed structure can be constructed so as to extend all the way out from the terminal to the parking position because it will interfere with and prohibit the aircraft from parking or eventually turn out under its own power for departure. Therefore, commuter airline passengers have always had to walk to the aircraft in an uncontrolled dangerous environment across the aircraft apron or airport tarmac. This exposure places the passengers in an endless amount of danger, chaos, inclement weather and inconvenience.

It is an object of the present invention to provide an apparatus overcoming the disadvantages inherent in present commuter aircraft loading and to provide a safe and protective walkway for the passengers.

It is an object of the present invention to provide a passenger walkway for "zero" height application and at the same time be capable of extending, retracting and radiusing left and right.

It is a further object of the present invention to make the apparatus totally self-contained and mobile so as to be utilized at any gate location of the user's terminal facilities throughout the entire terminal network, in other words, completely independent from any permanent facility.

It is a particular object of the present invention to form the passageway of generic interchangeable sections so the user can readily accommodate the ongoing changing criteria of aircraft operations without costly engineering expense.

These objects and others together with their advantages and uses will be apparent from the following description of the present invention.

BRIEF STATEMENT OF THE INVENTION

In accordance with the present invention there is provided a weatherproof passageway comprising a series of expandable frame sections which sections stand on wheel assemblies so as to move easily across a pavement or concrete apron. The frame sections are joined in an articulated manner so that the plurality of frame sections are deployable over a large distance and flexible to swing into position properly docking at the door of the aircraft. Over the top of each frame section is a weatherproof fabric cover. Interior fabric panels are suspended inside the walls to hang vertically on both sides to enclose the frame section. The cover and interior panel are spaced to provide a continuous wind relief pocket therebetween thereby reducing the chance of the extended passageway capsizing or overturning in severe weather conditions. Preferably, each of the frame sections are identical and are joined together front to back with a simple or latch mechanism. The fabric cover and interior panels are preferably secured by VELCRO fasteners both to the frame sections and to each other.

The walls of the frame sections are formed utilizing a scissor-like stud assembly so as to enable easy extension and collapse as well as flexible travel. Although the design is such that the passageway can be deployed manually, it is preferred to deploy and stow the unit via a uniquely built electro-mechanical powered drive unit.

Full details of the present invention are set forth in the following description and accompanying illustration of the preferred method and product.

DESCRIPTION OF THE INVENTION

Figure 1:
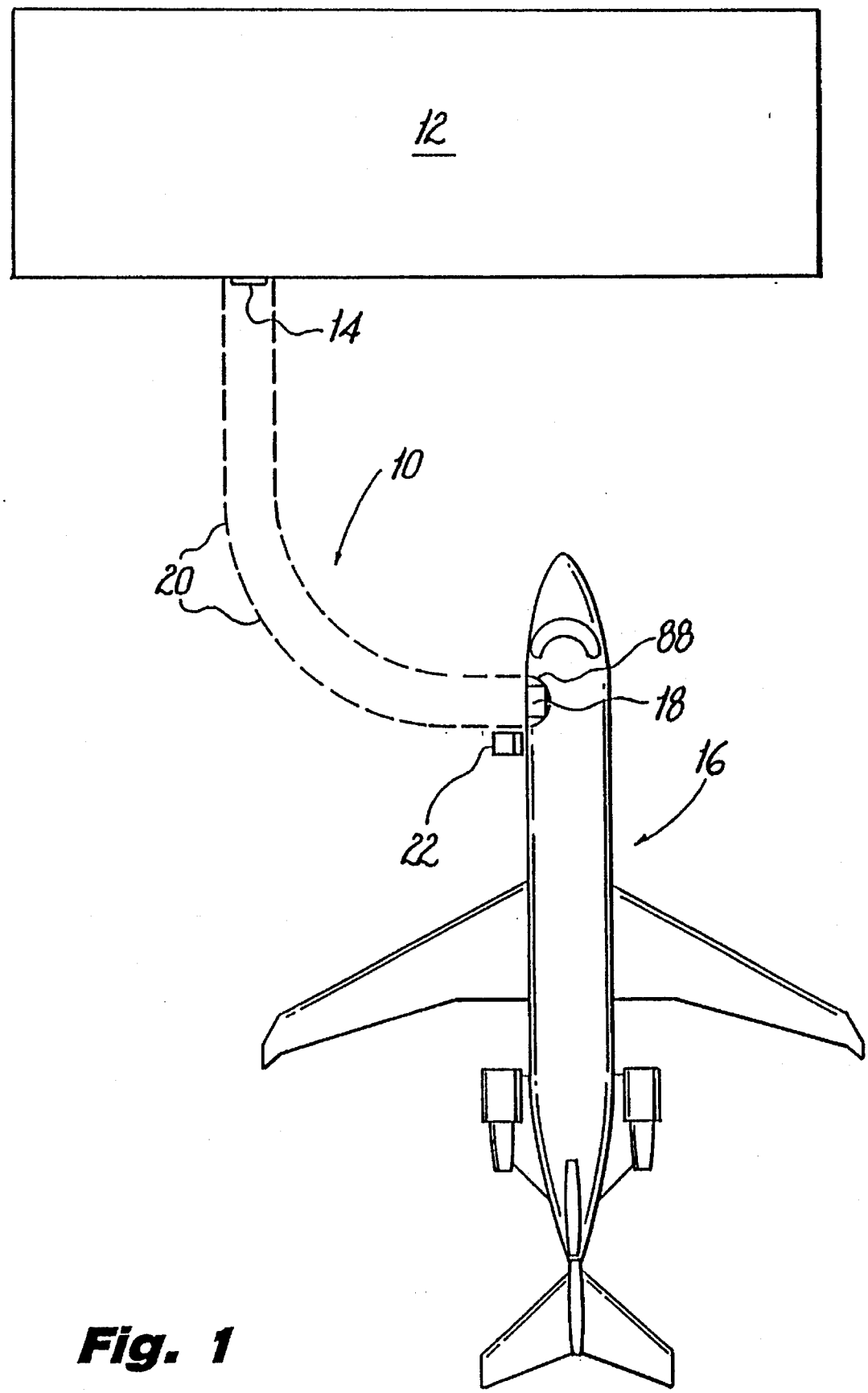
FIG. 1 is schematic plan view of a multi-sectional passageway embodying the present invention shown docked with a commuter aircraft.

The inventive passageway generally illustrated by the numeral 10 is schematically illustrated in FIG. 1. In use the passageway 10 is secured at its rear end to the apron wall of the terminal 12 so as to cover the exit gate 14 and is extendible outwardly therefrom so that its forward end will dock with the commuter airplane 16 so as to cover the entrance 18 to the airplane. The passageway 10 is formed of a plurality of collapsible frame sections 20, each wheel mounted on casters or rollers to be easily movable over the concrete apron or tarmac. Each of the sections 20 are joined together serially so that the passageway maybe deployed in extended condition in a manner to provide flexibility along its length and so that it may be radiused or swingable into an arc. In this way the airplane 16 can even be parked with its entrance perpendicular and offset to the terminal gate 14. The passageway is likewise collapsible for stowing.

While the passageway may be manually deployed and stowed, it is preferred to provide an electro/mechanical drive unit 22 which is easily attached to the front section so as to facilitate the movement particularly during high peak times. The drive unit 22 will also allow a collapsed passageway to be transported from one gate to another so that a single passageway may serve several gates.

Figure 2:
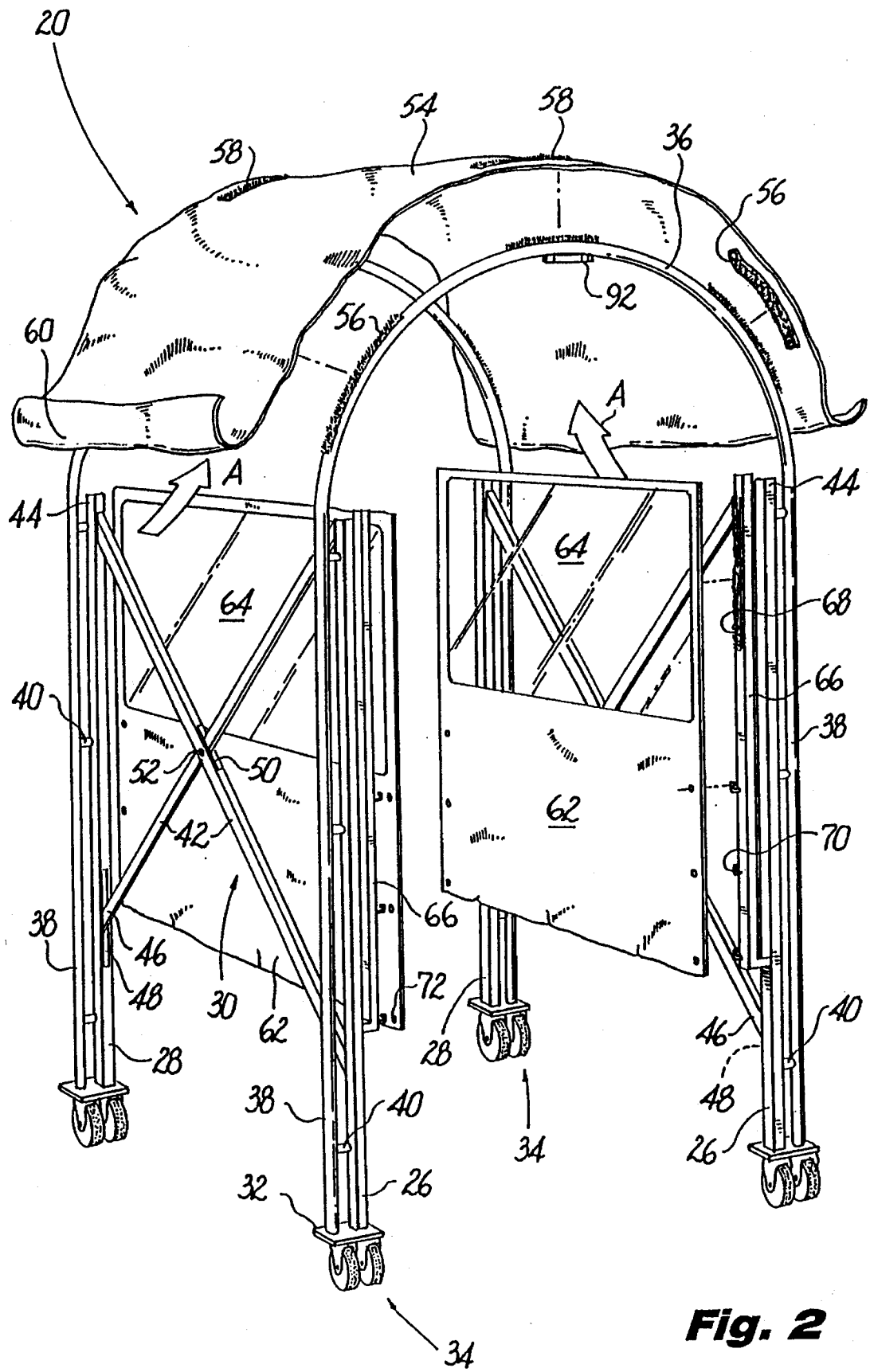
FIG. 2 is a perspective view of one section of the passageway shown in FIG. 1.

The construction of each frame section 20 is shown in detail in FIG. 2. Each frame section 20 comprises a pair of laterally opposed spaced side walls 24, each wall comprising a forward stanchion 26 and a rear stanchion 28 joined by a scissor like stud assembly 30. The elements of the frame section are preferably formed of metallic bar stock or hollow tubing. Aluminum members may also be used. Each stanchion 26 and 28 is welded at its lower end to a mounting bracket 32 of wheel assembly 34. The laterally opposed stanchions 26, 28 at the front and rear of each of the paired side walls are respectively joined by a U-shaped brace forming a roof arch beam 36 and having legs 38 which extend along the entire length of the stanchions 26 and 28. The legs 38 are also welded at their lower ends to the wheel assembly support bracket 32. The wheel assemblies are preferably in the form of casters, or rollers which swivel about a vertical axis, thus permitting the frame to be easily moved.

In addition spacers 40 are arranged at intervals between the legs 38 of the U-shaped brace and the adjacent stanchions 26, 28 being also welded thereto. Thus, by fixedly joining each of the paired front stanchions 26 and the paired rear stanchions 28, respectively, with a continuous U-shaped brace 36, each frame section 20 takes on the attribute of being integrally built as a complete unit while maintaining relative movement of the front and rear stanchions with respect to each other.

The scissor-like stud assembly 30 comprises a pair of pivoted bars 42 which criss-cross over themselves each being pivotally fixed at one end 44 to the upper ends of the respective stanchions 26, 28. The lower ends 46 of the bars 42 are slidably held in a slotted guide 48 integrally formed on the inner side of the opposite stanchion 26, 28. The slotted guide 48 is mounted at the lower ends of the stanchions 26, 28 and have a length about 10 to 12 inches. The crossing bars overlap each other and may be mutually provided with cut-outs 50 permitting the bars 42 to pivot over each other much like the action of a scissor. They may also be connected with a pivot pin 52 at their crossing point to increase rigidity of the wall. The lower ends of each bar 42 may be provided with laterally extending pins or flanges so as to be able to ride in the slotted guide without being detached therefrom, during movement.

Draped over the frame section and resting on the top of the roof arch 36 is a weatherproof (and, if desired, flameproof) fabric cover 54 which is preferably held in place by providing the cover 54 and the outer surface of the roof arch with mating VELCRO strips 56. Similarly, the leading and trailing edges of the cover 54 can also be provided with VELCRO strips 58 on its upper and lower surfaces so that the cover 54 of one section can be secured to that of its adjacent sections. If desired, cord lashing or other fastening means may be used. The lower edge 60 of the exterior covers 54 can fall below the arc of the roof arch, but it preferably does not extend fully down the side wall. The fabric weatherproof material used as the exterior cover 54 may be of any kind, although preferably the material sold under the trademark (BridgeTech, Inc., Brentwood, N.Y.) which is used in the more common fixed loading bridges may be used here.

Mounted on the interior of each wall 24 is vertical panel 62 which may have at least its upper half 64 of transparent material. The interior panel 62 is attached to the wall, employing a mounting bar 66 fixed to the stanchions 26 and 28 to which VELCRO strips 68 may be secured. The leading and trailing edges of the panel 62 are also provided with VELCRO strips to secure the panel. On the other hand, if desired, small hooks 70 spaced along the length of the bar may be used with the leading and trailing edge of the panel 62 provided with corresponding spaced grommets 72 which fit over the hooks 70. The interior panel 62 may be made of the same weatherproof and fireproof material as the exterior cover 54 although this is not critical as the panel 62 is sheltered somewhat from the weather. Thus, if desired, the panels 62 may be of vinyl material, canvas or other long lasting fabric.

As seen from FIG. 2, because the edges of the roof cover purposely do not extend below the arch and the upper edges of the interior panels 66 do not extend above the arch, there is left a space through which wind may flow as indicated by the arrow A. This space relieves the effect of any wind gust on the passageway so that the passageway will neither move or tip when fully extended in rough weather.

It will thus be understood that each frame section 20 is itself collapsible and extendible. Depending upon the exact geometric length of the stanchions and the connecting scissor stud assembly, the frame section can be extended as much as 48" and collapsed to approximately 6 inches. Of course, by varying the geometry the length can be varied. In practice it has been found that a commuter aircraft are generally parked between 50–100 feet from the terminal. Therefore, a train of approximately 20 frame sections should be sufficiently long when deployed. If necessary more or fewer sections can be used.

Figure 3:
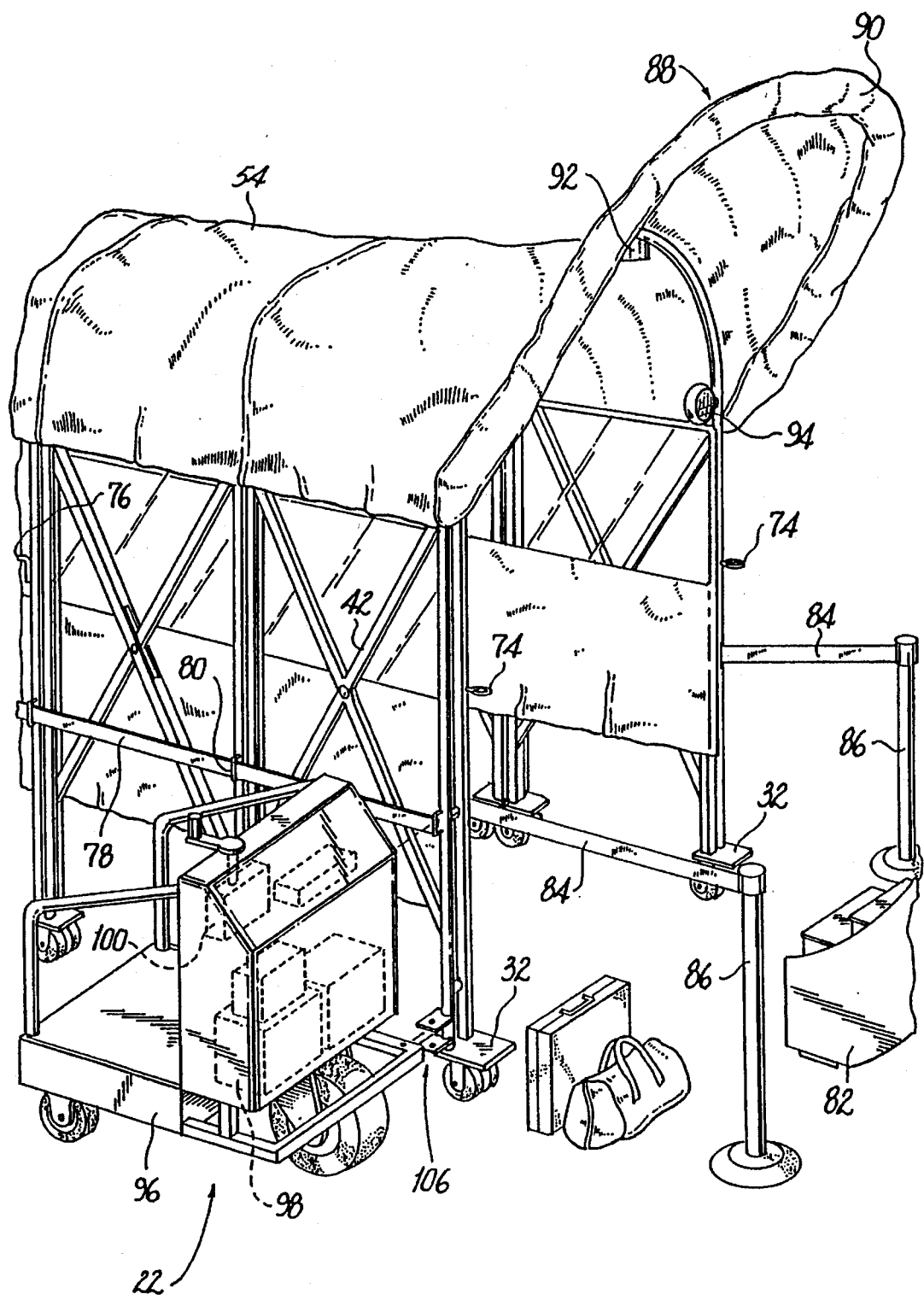
FIG. 3 is a perspective view of several sections of the passageway and drive unit.

As seen from FIG. 3 a train or series of sections are formed by providing the front stanchions and the rear stanchions with cooperating latch or connecting means whereby adjacent frame sections be articulately connected. For example, the front stanchions 26 may be provided with eye bolts 74 or other forms of staples while the rear stanchions are provided with pivotable latches 76. Other standard fastening means may be employed.

In addition, it may be desirable to provide a resilient biasing strap drawing the successive frame sections together, to this end a resilient elastic strap 78 may be stretched between the front frame section and the last frame section on each side. The exterior faces of the stanchions 26, 28 are provided with U-shaped handles 80 through which the strap 78 passes.

In general, the leading frame section will dock in abutment with the aircraft, straddling the staircase 82 which leads down from the aircraft and may be secured to the stairs. If this cannot be done then the staircases may be enclosed by an extendible belt 84 and portable stanchions 86. Preferably the leading frame section differs from the other frame sections in minor ways. First the roof 88 of the leading frame section is extended forwardly and upwardly following the line of the aircraft stairs 82 so that it terminates above the aircraft entrance 18. In addition, the edge of the roof 88 is padded as at 90 so as to softly abut against the aircraft. Solar powered battery operated lights 92 for general illumination. The leading frame section may also be provided with forwardly directed docking lights 94. The wheel assembly support bracket 32 may be slightly enlarged to allow the portable stanchion 86 to be placed thereon during deployment or storage of the passageway. A significant modification to the leading frame section may be described in that the scissor-like stud assembly 42 is arranged so as not to be collapsible. The criss-crossing studs may be locked together by suitable bolt means, in view of pivot pin 52. By preventing the leading frame section from collapsing, the train or entire passageway may be more easily pulled or pushed for deployment.

The leading frame section is, of course, hooked to the drive unit for deployment by suitable latch means. The drive unit 22 comprises a small wheeled truck 96 accommodating one operator and is provided with an electric propulsion motor 96 having a battery and charging system, control mechanisms such as forward/reverse 100, left/right and hydraulic brake. The drive unit 22 and the front stanchion of the leading frame section are provided with cooperating hook and latch members 106 allowing the drive unit to be removably attached to the passageway whereby it may move and maneuver the passageway into deployment or storage position.

It is to be noted that a significant advantage of the present invention lies in the absence of a floor for the frame sections. The frame sections are thus light in weight and materially cheaper to construct. The frame sections each roll easily over the ground. Small accumulation of snow or debris on the ground will not interfere with movement. Larger accumulations will normally not exit, being uncovered promptly by airport personnel.

It is, thus, seen from the foregoing that a simple, easily constructed protective corridor for the swift movement of passengers is provided. The passageway is easily used and moved into position relative to the aircraft, no matter the parked position of the aircraft. Since the frame sections are identical they may be easily removed from or added to the passageway so that even the length of the fully extended passageway may be varied. The passageway as a whole is designed to be independent of any permanent facility and may be moved from terminal gate to terminal gate, when necessary.

To facilitate stowing as well as movement of the passageway, the wheel support brackets 32 may be vertically offset so as not to interfere with each other when the passageway is collapsed.

Various modifications and changes have been disclosed herein, and others will be apparent to those skilled in this art. Therefore, it is to be understood that the present disclosure is by way of illustration and not limiting of the present invention.

What is claimed is:

1. A passageway through which passengers may move for unloading and loading aircraft comprising a plurality of independent frame sections having a leading frame section and a trailing frame section arranged in longitudinal end to end series, each section having means enabling movement on the ground, said frame sections being articulately connected to form an elongated flexible corridor, each frame section being independently extendable in the longitudinal end to end series in the formation of said elongated flexible corridor and independently collapsible in the longitudinal direction selectively to reduce the elongation of the corridor, thereby selectively enabling extended deployment of said passageway or stowing of said passageway in retracted collapsed condition, each of said sections being connected to its adjacent section in the longitudinal series by pivotal latch means enabling said passageway to flex laterally and assume an arcuate disposition.

2. The passageway according to claim 1, wherein each of said frame sections comprise a pair of spaced side walls, each of said side walls having a front and rear stanchion fixedly mounted on roller means and being connected by a longitudinally collapsible stud assembly, the corresponding front and rear stanchions of said pairs being fixedly joined to a roof beam.

3. The passageway according to claim 2, including a fabric foldable cover extending over each frame section and secured to said roof beam.

4. The passageway according to claim 3, including a fabric foldable panel mounted within said frame on each of said paired walls the lower end of said roof cover and the upper end of said wall panels being spaced from each other to provide an opening for the flow of air through said frame.

5. The passageway according to claim 2, wherein said stud assembly comprises a pair of stud bars arranged to criss-cross each other, the upper end of each of said stud bars being pivotally fixed to a respective one of said front and rear stanchions, the lower ends of each stud bar being slidably attached to the other one of said stanchions.

6. The passageway according to claim wherein each stanchion is provided with a slotted guide into which the lower end of the respective stud bar is slidingly held.

7. The passageway according to claim 2, wherein the leading frame section includes means for selectively preventing the collapse of said stud assembly and frame.

8. The passageway according to claim 2, wherein the leading frame section is provided with an enlarged canopy at its front end extending above and forward of the roof beam to provide a cover for the aircraft door.

9. The passageway according to claim 8, including motorized drive means, and means for connecting said drive means to the leading frame section, whereby said frame sections is selectively pulled into extended condition or pushed into collapsed condition.

10. The passageway according to claim 2, including motorized drive means, and means for connecting said drive means to the leading frame section, whereby said frame sections is selectively pulled into extended condition or pushed into collapsed condition.

11. The passageway according to claim 1, wherein said latch means comprise a removable hinge mechanism.

12. The passageway according to claim 11, including a resilient expandable band extending from the leading frame section to the trailing frame section so as to normally bias said series of sections together.

13. The passageway according to claim 1, including motorized drive means, and means for connecting said drive means to the leading frame section, whereby said frame sections is selectively pulled into extended condition or pushed into collapsed condition.

* * * * *

UNITED STATES PATENT AND TRADEMARK OFFICE
CERTIFICATE OF CORRECTION

PATENT NO. : 5,603,343
DATED : February 18, 1997
INVENTOR(S) : James Larson

It is certified that error appears in the above-indentified patent and that said Letters Patent is hereby corrected as shown below:

Column 6, line 22 after "claim" insert --5--

Signed and Sealed this

Thirteenth Day of May, 1997

Attest:

BRUCE LEHMAN

Attesting Officer         Commissioner of Patents and Trademarks